2,833,441
SILOXANE COATED COOKING UTENSILS

Robert C. Hedlund, Midland, Mich., assignor to Dow Corning Corporation, Midland, Mich., a corporation of Michigan No Drawing. Application January 24, 1957
Serial No. 635,988

3 Claims. (Cl. 220—64)

This invention relates to an improved siloxane coated cooking utensil.

The use of siloxane resins and siloxane fluids for coating cooking utensils such as bread pans, skillets and the like has been practiced commercially for some time. This use is particularly set forth in U. S. Patents 2,606,510 and 2,462,242. Siloxane coated cooking utensils, especially those that are coated with thermosetting siloxane resins, are particularly useful because food cooked therein will release from the surface without the necessity of using grease. This is particularly true of bread, and as a result siloxane resin coated bread pans are now extensively used in bakeries.

However, there are certain types of foods which do not release satisfactorily from the siloxane resins and fluids described in the aforementioned patents. For example, cakes, pies, pastries, cookies and other types of foods which are high in sugar content and/or which are high in moisture content tend to stick to the conventional siloxane coatings heretofore employed. The degree of sticking varies depending upon the type of food. For example, pie filling will not release when the pie is baked in a utensil coated with the resins described in the aforesaid patents. Also, if bread dough contains excessive moisture, the release heretofore obtained was much poorer than with the normal dough encountered in commercial bakeries. Thus, for example, whereas with normal dough one may obtain consistently good release through 200 to 300 bakes without recoating, wet or under fermented doughs would release for only 25 to 25 bakes or less. As a result of these difficulties, the heretofore employed siloxanes could not be used successfully for a wide variety of foods which are prepared in commercial bakeries or by housewives.

It is the object of this invention to provide siloxane cooking utensils from which practically any type of baked goods will release. Another object is to provide an improved siloxane coated cooking utensil. Other objects and advantages will be apparent from the following description.

This invention relates to a cooking utensil coated with a cured composition consisting essentially of (1) from 70 to 99% by weight of a siloxane resin of the unit formula $$R_nSiO_{\frac{4-n}{2}}$$

in which R is a saturated aliphatic or aryl hydrocarbon radical and $n$ has an average value from 1 to 1.8 inclusive, (2) from 1 to 30% by weight of a vinyl containing siloxane in which any remaining organic radicals are of the group consisting of methyl and phenyl radicals, the amount of vinylsiloxane in (2) being such that there is at least 1% by weight vinylsiloxane in the total composition and (3) from 0 to 15% by weight of a methylsiloxane fluid incompatible with (1) and being free of alkenyl radicals, the total amount of (2) and (3) being not greater than 30% by weight of the total composition.

Applicant has found that the inclusion of limited amounts of vinylsiloxane in the siloxane resins heretofore employed on cooking utensils gives an unexpectedly good release of foods having a high sugar content and/or a high moisture content. The term "vinylsiloxane" as employed herein means a siloxane having at least one vinyl group attached to each silicon atom. The term "vinyl containing" siloxane is a siloxane containing at least some vinylsiloxane.

Specific examples of operative vinyl containing siloxanes (2) are vinylsiloxanes such as monovinylsiloxane, divinylsiloxane, vinylmethylsiloxane, vinylphenylsiloxane, trivinylsiloxane, divinylmethylsiloxane, divinylphenylsiloxane, vinyldimethylsiloxane, vinyldiphenylsiloxane and vinylphenylmethylsiloxane, and copolymers of these vinylsiloxanes with phenyl and methylsiloxanes such as trimethylsiloxane, phenyldimethylsiloxane, diphenylmethylsiloxane, triphenylsiloxane, dimethylsiloxane, phenylmethylsiloxane and diphenylsiloxane.

For the purpose of this invention siloxane (2) can either be mixed with or copolymerized with siloxane (1).

Siloxane (1) can be any resinous siloxane of the unit formula $$R_nSiO_{\frac{4-n}{2}}$$

where R is any saturated aliphatic hydrocarbon radical such as methyl, ethyl, propyl, or butyl, or any aryl hydrocarbon radical such as phenyl, xenyl, tolyl or naphthyl. $n$ can range from 1 to 1.8, but the preferred range of $n$ is from 1.3 to 1.6 inclusive. Preferably siloxane resin (1) is a methylphenylsiloxane resin.

If desired, the compositions of this invention may contain up to 15% by weight of a methylsiloxane fluid which is incompatible with (1). It has been found that when these fluids are employed in conjunction with (2), even better release of baker goods is obtained. The term "methylsiloxane fluid" as employed herein includes those fluids in which all of the organic radicals are methyl together with those fluids in which some of the organic radicals are other than methyl such as phenyl, xenyl and the like. Thus, for example, fluid (3) can be dimethylsiloxane or copolymers of dimethyl and trimethylsiloxanes or copolymers of dimethysiloxane with other saturated aliphatic hydrocarbon and aryl hydrocarbon siloxanes such as phenylmethylsiloxane, diphenylsiloxane, diethylsiloxane, ethylmethylsiloxane, xenylmethylsiloxane, phenyldimethylsiloxane or diphenylmethylsiloxane. In general, fluids which are incompatible with (1) are those which contain at least 75 mol percent dimethylsiloxane.

The cooking utensils employed in this invention are prepared by mixing ingredients (1), (2) and (3) or by mixing (3) with a copolymer of (1) and (2). This mixing is most conveniently done by employing a mutual solvent such as toluene, xylene, perchloroethylene, methylene chloride, petroleum ethers and the like. The solution is then applied to the cooking utensil in any desired manner such as by dipping, brushing, spraying or flooding. After coating, the resin is then cured by heating to a suitable temperature. In general, the curing is carried out at temperatures ranging from 300 to 500° F. although higher temperatures may be employed if desired.

In order to hasten the cure of the resin, conventional siloxane resin catalysts may be employed. Such catalysts include carboxylic acid salts of metals such as lead naphthenate, tin octoate, dibutyltindiacetate, ferric naphthenate, cobalt octoate, and zinc 2-ethylhexoate and quaternary ammonium compounds such as tetramethylammoniumacetate and benzyltrimethylammonium hydroxide.

After the resin is cured on the utensil the latter may then be employed in the baking of foods. Excellent release is obtained with practically any type of baked goods such as cakes, pies, candy, bread, French pastries, whole wheat bread, and cookies.

The essential ingredients of the coating composition of this invention are siloxanes (1), (2), and, if desired, (3). However, the coating may contain other nonessential ingredients such as pigments, curing catalysts, fillers, oxidation inhibitors and other materials which may be added to improve specific properties of the coating, without departing from the scope of this invention.

The following examples are illustrative only and should not be construed as limiting the invention which is properly set forth in the appended claims.

Example 1

The siloxane resin employed in this example was a copolymer of monophenylsiloxane, monomethylsiloxane, diphenylsiloxane and dimethylsiloxane, so proportioned that there was a hydrocarbon to silicon ratio of 1.4. This resin was mixed with varying amounts of other siloxanes shown in the table below together with ferric octoate in amount to give .05% by weight iron based on the weight of the resin.

In each case shown in the table below metal panels were coated with the formulations indicated by spraying them with one coat of a 20% hydrocarbon solvent solution of the indicated siloxanes. The coated panels were then heated two hours at 425° F. to cure the coating.

Various foods were then baked on the coated metal panels and the release after each bake was noted.

taining siloxane in which any remaining organic radicals are selected from the group consisting of methyl and phenyl radicals, the amount of vinylsiloxane in (2) being such that there is at least 1% by weight of vinylsiloxane in the total composition, and (3) from 0 to 15% by weight of a methylsiloxane fluid incompatible with (1) and being free of alkenyl radicals, the total amount of (2) and (3) being not greater than 30% by weight of the total composition.

2. A cooking utensil coated with the cured composition consisting essentially of (1) from 70 to 99% by weight of a methylphenylsiloxane resin having an average of from 1.3 to 1.6 inclusive total methyl and phenyl radicals per silicon, (2) from 1 to 30% by weight of a vinylmethyl containing siloxane, the amount of vinylmethylsiloxane in (2) being such that there is at least 1% by weight of vinylmethylsiloxane in the total composition, and (3) from 0 to 15% by weight of a methylsiloxane fluid incompatible with (1) and being free of alkenyl radicals, the total amount of (2) and (3) being not greater than 30% by weight of the total composition.

3. A cooking utensil coated with a cured composition consisting essentially of (1) from 70 to 99% by weight of a methylphenylsiloxane resin having an average of from 1.3 to 1.6 inclusive total methyl and phenyl groups per silicon, (2) from 1 to 30% by weight of a vinylphenyl containing siloxane, the amount of vinylphenylsiloxane in (2) being such that there is at least 1% by weight vinylphenylsiloxane in the total composition, and (3) from

| Runs | Composition of siloxane in percent by weight | Food Baked | Release |
|---|---|---|---|
| 1* | 90% resin, 10% dimethylsiloxane fluid | White cake / Raisin pie filling | Fair. / Poor. |
| 2 | 90% resin, 10% of a 500 cs. copolymer of vinylmethylsiloxane and trimethylsiloxane. | Raisin pie filling / White cake | Good. / Do. |
| 3 | 80% resin, 15% of a copolymer of vinylmethylsiloxane and trimethylsiloxane, 5% of a copolymer of 90 mol percent dimethylsiloxane and 10 mol percent phenylmethylsiloxane. | Raisin pie filling / White cake | Excellent. / Do. |
| 4 | 90% resin, 2.5% of a copolymer of 90 mol percent dimethylsiloxane and 10 mol percent phenylmethylsiloxane, 7.5% of a copolymer of vinylmethylsiloxane and trimethylsiloxane. | Fruit cake / Whole pie / French sweet rolls | Do. / Do. / Good. |
| 5 | 90% resin, 10% vinylphenylsiloxane | White cake / Raisin pie filling | Do. / Do. |
| 6 | 80% resin, 20% of a copolymer of 50 mol percent phenylvinylsiloxane, 50 mol percent phenylmethylsiloxane. | White cake / Raisin pie filling | Do. / Do. |

*This run containing no vinylsiloxane is given for comparison.

That which is claimed is:

1. A cooking utensil coated with a cured composition consisting essentially of (1) from 70 to 99% by weight of a siloxane resin of the unit formula

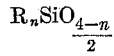

in which R is selected from the group consisting of saturated aliphatic hydrocarbon radicals and aryl hydrocarbon radicals and $n$ has an average value from 1 to 1.8 inclusive, (2) from 1 to 30% by weight of a vinyl con- 0 to 15% by weight of a methylsiloxane fluid incompatible with (1) and being free of alkenyl radicals, the total amount of (2) and (3) being not greater than 30% by weight of the total composition.

References Cited in the file of this patent

UNITED STATES PATENTS

| | | |
|---|---|---|
| 2,558,584 | Safford | June 26, 1951 |
| 2,672,455 | Currie | Mar. 16, 1954 |
| 2,728,736 | Hunter et al. | Dec. 27, 1955 |